United States Patent [19]
King et al.

[11] Patent Number: 5,536,461
[45] Date of Patent: Jul. 16, 1996

[54] TUBE MULTI-PACK METHODS OF MANUFACTURE

[75] Inventors: Jon E. King, St. Louis; Phillip M. Brewer, Fenton; Bradley G. Stack, St. Louis, all of Mo.

[73] Assignee: Sinclair & Rush, Inc., St. Louis, Mo.

[21] Appl. No.: 362,846

[22] Filed: Dec. 22, 1994

[51] Int. Cl.$^6$ .................................................. B29C 47/90
[52] U.S. Cl. ........................ 264/209.3; 264/177.17; 264/209.8; 264/281; 264/285; 425/319; 425/380; 425/391; 425/467
[58] Field of Search .......................... 264/209.3, 209.4, 264/209.2, 209.1, 209.8, 285, 281, 177.10, 177.14, 103, 177.17; 425/380, 466, 467, 319, 391

[56] References Cited

U.S. PATENT DOCUMENTS

| | | | |
|---|---|---|---|
| 2,687,997 | 8/1954 | Marchand | 264/177.14 |
| 3,520,963 | 7/1970 | Allseits et al. | 264/209.4 |
| 3,924,738 | 12/1975 | Poupitch | 264/159 |
| 3,935,357 | 1/1975 | Padovani | 264/209.1 |
| 4,113,814 | 9/1978 | Kojimoto et al. | 425/380 |
| 4,117,064 | 9/1978 | Mathe et al. | 264/103 |
| 4,313,327 | 2/1982 | O'Connor | 425/381 |
| 4,541,569 | 9/1985 | Langa | 264/209.1 |
| 4,655,987 | 4/1987 | Zertuche | 264/209.8 |
| 4,836,968 | 6/1989 | Cakmakci | 264/209.3 |
| 5,059,057 | 10/1991 | Graef | 403/298 |

FOREIGN PATENT DOCUMENTS

| | | | |
|---|---|---|---|
| 56-19732 | 2/1981 | Japan | 264/209.8 |
| 4-14425 | 1/1992 | Japan | 264/209.8 |

*Primary Examiner*—Jeffery R. Thurlow
*Attorney, Agent, or Firm*—Polster, Lieder, Woodruff & Lucchesi

[57] ABSTRACT

Tube multi-pack methods of manufacture are disclosed. The tube multi-packs that are produced by the method of the present invention are one-piece tube multi-pack including an elongated thin-walled tubular element made of transparent flexible plastic material with inner and outer peripherally extending walls. At least one thin-walled web section is integrally connected to the inner peripheral extending wall of the tubular element and has greater flexibility than the tubular element in order to adjustably accommodate a plurality of separate discrete products positioned on opposite sides of the at least one integral web section. The at least one integral thin-walled web section may be connected to the inner peripherally extending wall of the tubular element at different relative locations, for example, in a spiral or curvilinear or other shaped path throughout the tubular element. According to the present invention, the method for making the one-piece tube multi-pack includes the extrusion of the elongated thin-walled tubular element at the same time that at least one thin-walled web section is extruded with greater flexibility than the tubular element. When formed to extend at different relative locations throughout the tubular element, such as a spiral or curvilinear or other shaped path, the tubular element is twisted while in a heated state to form the shape throughout the tubular element.

8 Claims, 6 Drawing Sheets

TUBE MULTI-PACK METHODS OF MANUFACTURE

BACKGROUND OF THE INVENTION

The present invention relates to a one-piece tube multi-pack and methods of manufacturing same.

Paper and plastic packaging tubes are well known in the art. In some instances, it is desirable to separate or segregate discrete products or components into separate areas within the packaging tube. This can be accomplished either by utilizing a separate insert to segregate the discrete products or components or by forming the packaging tube with integral independent sections. One example of a tubular element with a series of internal support walls forming a plurality of passageways is shown in U.S. Pat. No. 5,059,057.

In order to adjustably accommodate discrete products or components in separate compartments or passageways within a packaging tube, it is desirable that the packaging tube and the segregated sections be sufficiently flexible with respect to one another.

In addition to providing separate compartments or passageways for the discrete products or components, the packaging tube must also be attractive and aesthetically pleasing. This can be achieved through a number of different modified shapes and designs in the packaging tube and/or the separate compartments or passageways, as will become understood from the discussion that follows.

SUMMARY OF THE INVENTION

Among the several objects and advantages of the present invention is to provide a new and improved one-piece tube multi-pack including an elongated thin-walled tubular element and at least one thin-walled web section integrally connected to an inner wall of the tubular element;

The provision of the aforementioned one-piece tube multi-pack in which the at least one thin-walled web section has greater flexibility than the tubular element in order to adjustably accommodate a plurality of separate discrete products positioned on opposite sides of the at least one integral thin-walled web section;

The provision of the aforementioned one-piece tube multi-pack which may include a plurality of thin-walled integral web sections interconnected to one another and to an inner peripheral wall of the tubular element;

The provision of the aforementioned one-piece tube multi-pack in which the at least one integral thin-walled web section is connected to an inner peripheral wall of the tubular element at different relative locations, throughout the tubular element, such as a spiral, curvilinear or other shaped path;

The provision of the aforementioned one-piece tube multi-pack in which the tubular element and at least one thin-walled web section are formed from transparent plastic material and may also include a spirally extending non-transparent ribbon element along an outer peripheral wall of the tubular element, in order to provide an attractive and aesthetically pleasing product;

The provision of a method for manufacturing the one-piece tube multi-pack including the extrusion of the elongated tubular element and the at least one thin-walled web section with greater flexibility than the tubular element;

The provision of the aforementioned method of manufacturing the one-piece multi-pack including the forming of the integral thin-walled web section at different relative locations throughout the tubular element, such as a spiral, curvilinear or other shaped path; and The provision of the aforementioned method for manufacturing the one-piece tube multipack which includes the twisting of the tubular element while in a heated state to form the at least one integral thin-walled web section to extend at different relative locations, such as a spiral, curvilinear or other shaped path throughout the tubular element.

Briefly stated, the one-piece tube multi-pack of the present invention includes an elongated thin-walled tubular element made of transparent flexible plastic material having inner and outer peripherally extending walls. At least one thin-walled web section also made of transparent flexible plastic material is integrally connected at opposite ends to the inner peripheral extending wall of the tubular element. The at least one integral thin-walled web section is formed with greater flexibility than the tubular element in order to adjustably accommodate a plurality of separate discrete products positioned on opposite sides of the at least one integral thin-walled web section.

The at least one integral web section may have the same or a lesser thickness than the tubular element.

The one-piece tube multi-pack may include a plurality of thin-walled web sections interconnected to one another at one end and interconnected to the inner peripherally extending wall of the tubular element at an opposite end. In certain instances, there may be three equally spaced thin-walled web sections.

The at least one integral thin-walled web section may be connected to the inner peripherally extending wall of the tubular element at different relative locations throughout the tubular element. Such different relative locations may include a spiral, curvilinear or other shaped path for the at least one integral thin-walled web section throughout the tubular element.

In addition to being made of a transparent flexible plastic material, a spirally extending non-transparent ribbon element may be attached to the outer peripherally extending wall of the tubular element to provide an attractive and aesthetically pleasing product.

The method for manufacturing the one-piece tube multi-pack includes the extrusion of the elongated thin-walled tubular element with inner and outer peripherally extending tubular walls and the simultaneous extrusion of the at least one integral thin-walled web section with opposite ends interconnected to the inner peripherally extending wall of the tubular element, the at least one integral thin-walled web section being formed with greater flexibility than the tubular element.

The method may include the step of simultaneously extruding a plurality of thin-walled web sections interconnected to one another and to the inner peripherally extending wall of the tubular element.

The at least one integral thin-walled web section may be formed to extend at different relative locations throughout the tubular element, such as in a spiral, curvilinear or other shaped path. In order to form the at least one integral thin-walled web section to extend at different relative locations throughout the tubular element, the tubular element is preferably twisted while in a heated state to form the desired shape of the at least one integral thin-walled web section throughout the tubular element. Preferably, such twisting occurs shortly after the extrusion of the tubular element and the at least one integral thin-walled web section.

These and other objects and advantages of the invention will become apparent from the description that follows.

BRIEF DESCRIPTION OF THE DRAWINGS

In the drawings.

Corresponding reference numerals will be used throughout the several figures of the drawings.

DESCRIPTION OF THE PREFERRED EMBODIMENTS

The following detailed description illustrates the invention by way of example and not by way of limitation. This description will clearly enable one skilled in the art to make and use the invention, and describes several embodiments, adaptions, variations, alternatives and uses of the invention, including what we presently believe is the best mode of carrying out the invention.

The one-piece tube multi-packs of the present invention are disclosed in several different embodiments, as illustrated in FIGS. 1–3, 4–6, 7–9, 10–12, and 13–16 of the drawings.

In addition, the method for forming the one-piece tube multi-packs of the present invention will be further described in connection with FIGS. 17–18 of the drawings.

Figures 1, 2, 3:
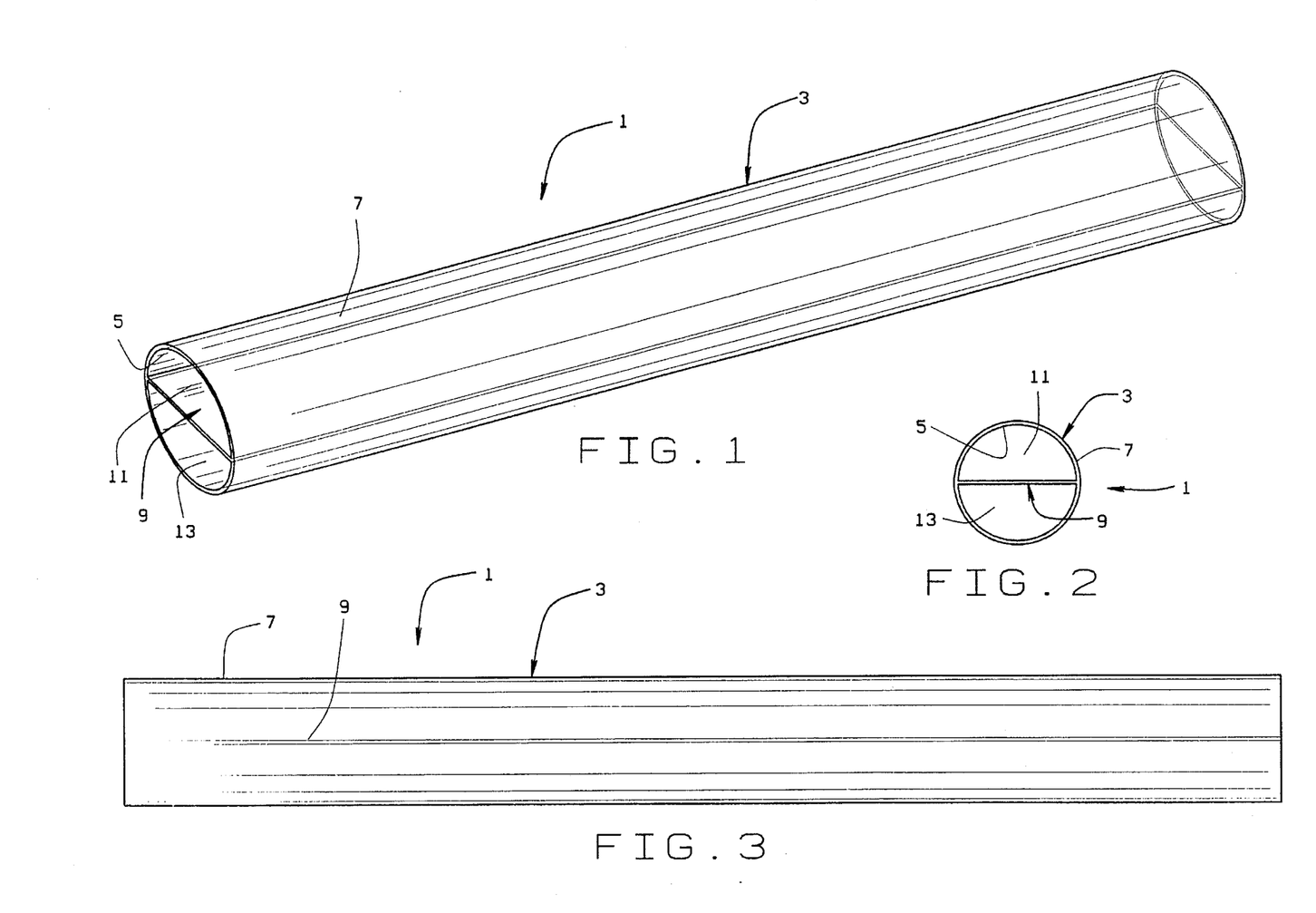
FIG. 1 is a perspective view of one embodiment of the one-piece tube multi-pack of the present invention.
FIG. 2 is an end elevational view of the one-piece tube multi-pack shown in FIG. 1.
FIG. 3 is a side elevational view of the one-piece tube multi-pack shown in FIG. 1.

Referring first to the various different embodiments of the one-piece tube multi-pack, FIGS. 1–3 illustrate one embodiment. The one-piece tube multi-pack 1 includes an elongated thin-walled tubular element 3 made of transparent flexible plastic material having inner and outer peripherally extending wall 5, 7, respectively. An integral thin-walled web section 9, also made of transparent flexible plastic material, is integrally connected at opposite ends to the inner peripherally extending wall 5 of the tubular element 3.

In order to adjustably accommodate a plurality of separate discrete products positioned on opposite sides of the integral thin-walled web section 9, the integral thin-walled web section 9 is constructed to have greater flexibility than the tubular element 3. As will be appreciated, the tubular element 3 has inherent hoop strength to prevent deformation or collapse of the tubular elements 3. However, it is important that the tubular element 3 and the integral thin-walled web section 9 have a sufficient thin-walled construction in order to enable the integral thin-walled web section 9 to have greater flexibility than the tubular element 3, due to the inherent hoop strength configuration of the tubular element 3. As a result, the integral thin-walled web section 9, even though made of the same thickness as the thin-walled tubular element 3, will be capable of flexing to accommodate separate discrete products in the two compartments 11, 13. If necessary, the integral thin-walled web section may have less thickness than the tubular element, although this is not necessarily required.

Because the tubular element 3 and the integral thin-walled web section 9 are preferably both made of transparent flexible plastic material, a variety of different types of products can be packaged within the one-piece tube multi-pack 1. For example, candy, confections, novelty items, and functional items can be packaged in different colors and/or shapes within the two separate compartments 11, 13 of the one-piece tube multi-pack 1. If the plurality of discrete products have contrasting colors, i.e., red and green candy covered chocolates, the transparency of the tubular element 3 and the thin-walled web section 9 will provide an attractive and aesthetically pleasing appearance prior to and during consumption or use of the products within the one-piece tube multi-pack 1.

Figures 4, 5, 6:
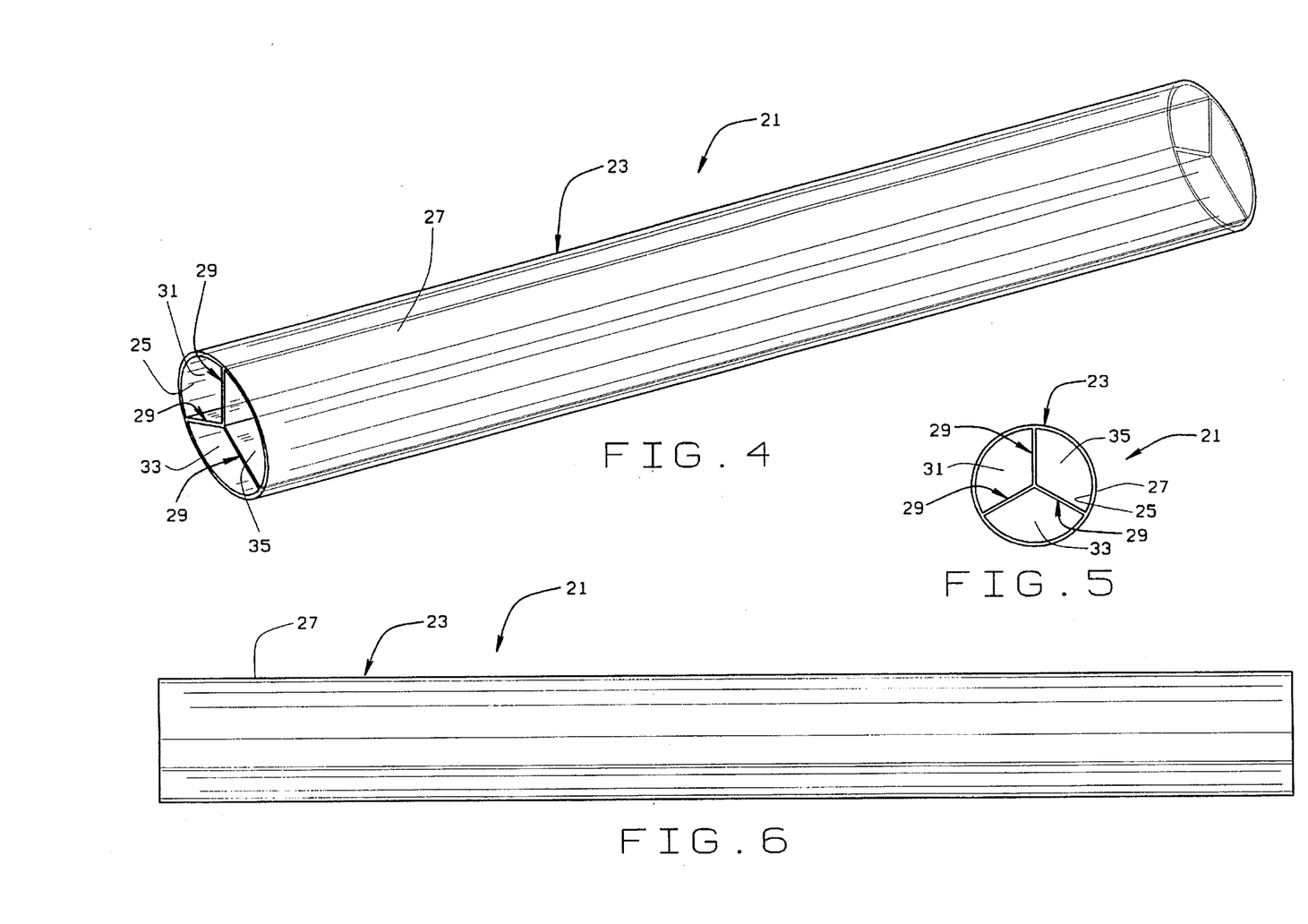
FIG. 4 is a perspective view of a modified form of a one-piece tube multi-pack of the present invention.
FIG. 5 is an end elevational view of the one-piece tube multi-pack shown in FIG. 4.
FIG. 6 is a side elevational view of the one-piece tube multi-pack shown in FIG. 4.

As illustrated in FIGS. 4–6 of the drawings, the one-piece tube multi-pack 21 may be manufactured with a plurality of thin-walled web sections. Specifically, the inner wall 25 of the tubular element 23 may have a plurality of integral thin-walled web sections 29, 29, 29 interconnected to one another at one end and interconnected to the inner peripherally extending wall 25 at an opposite end. In the FIGS. 4–6 embodiment, there are three equally spaced thin-walled web sections 29, 29, 29; however, it will be understood that one or more of the integral web sections 29 may be shorter or constructed at a different angle than the other integral web sections 29, 29, as may be desired. In the FIGS. 4–6 embodiment, it will be noted that the three equally spaced thin-walled web sections 29, 29, 29 produce three separate compartments or passageways 31, 33 and 35 for receiving the plurality of discrete products, in the same manner as the FIGS. 1–3 embodiment.

Figures 7, 8, 9:
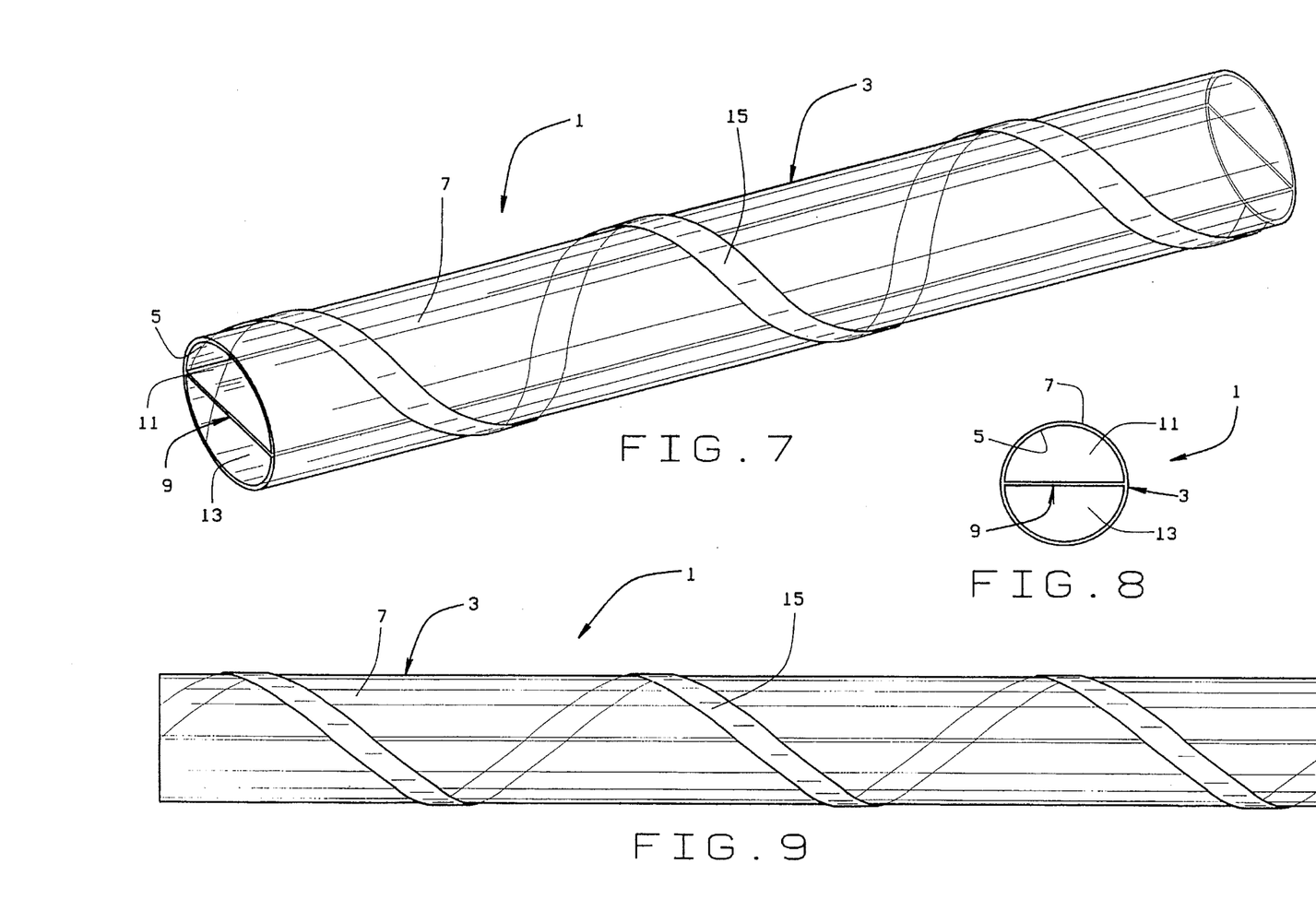
FIG. 7 is a perspective view of another modified form of one-piece multi-pack of the present invention.
FIG. 8 is an end elevational view of the one-piece tube multi-pack shown in FIG. 7.
FIG. 9 is a side elevational view of the one-piece tube multi-pack shown in FIG. 7.
Figures 10, 11:
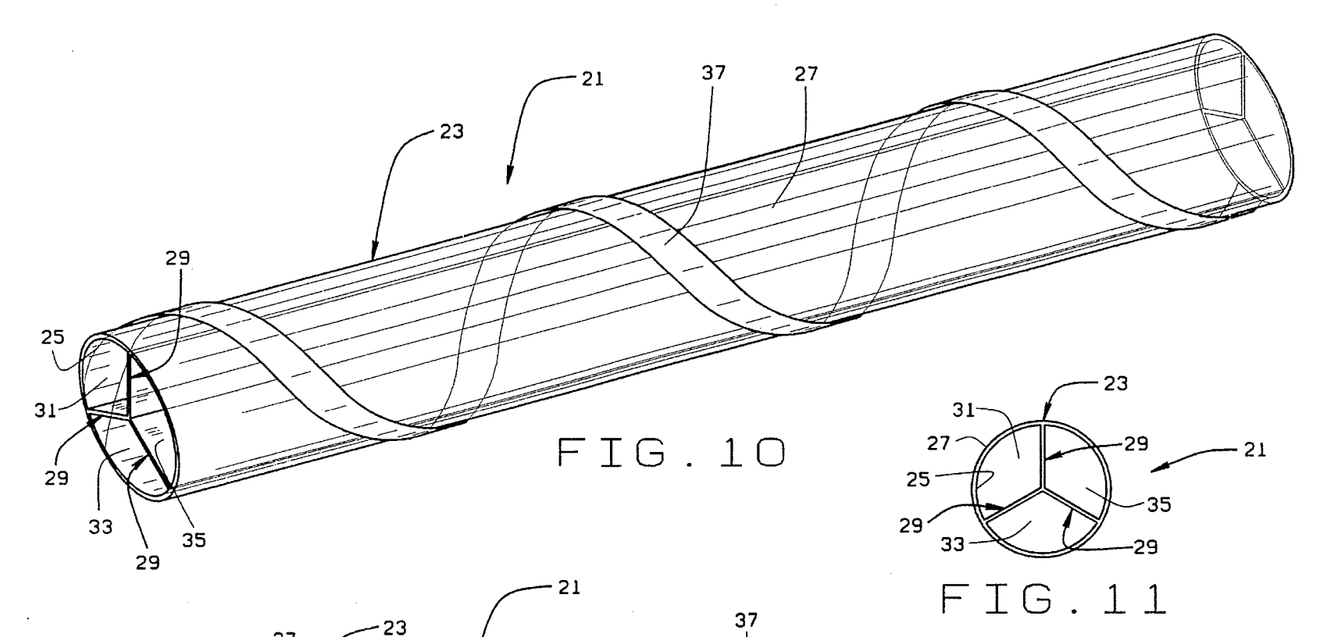
FIG. 10 is a perspective view of still another modified form of one-piece tube multipack of the present invention.
FIG. 11 is an end elevational view of the one-piece tube multi-pack shown in FIG. 10.
Figure 12:
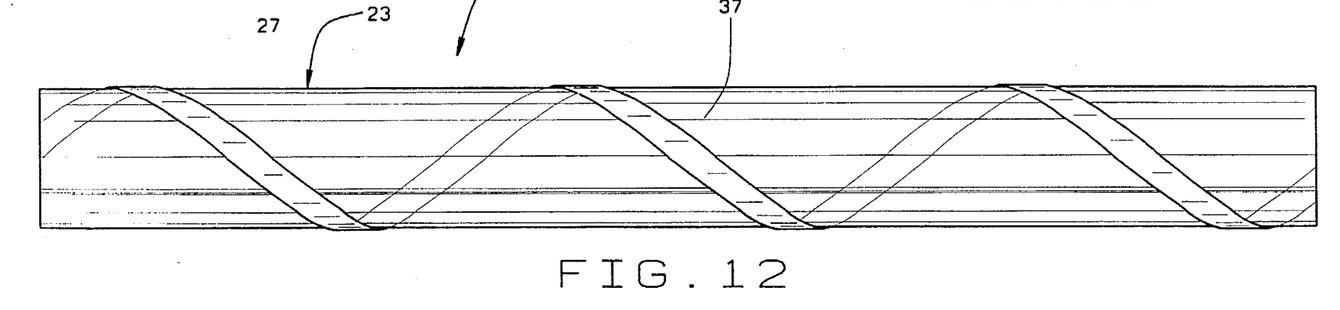
FIG. 12 is a side elevational view of the one-piece tube multi-pack shown in FIG. 10.
Figures 13, 14, 15:
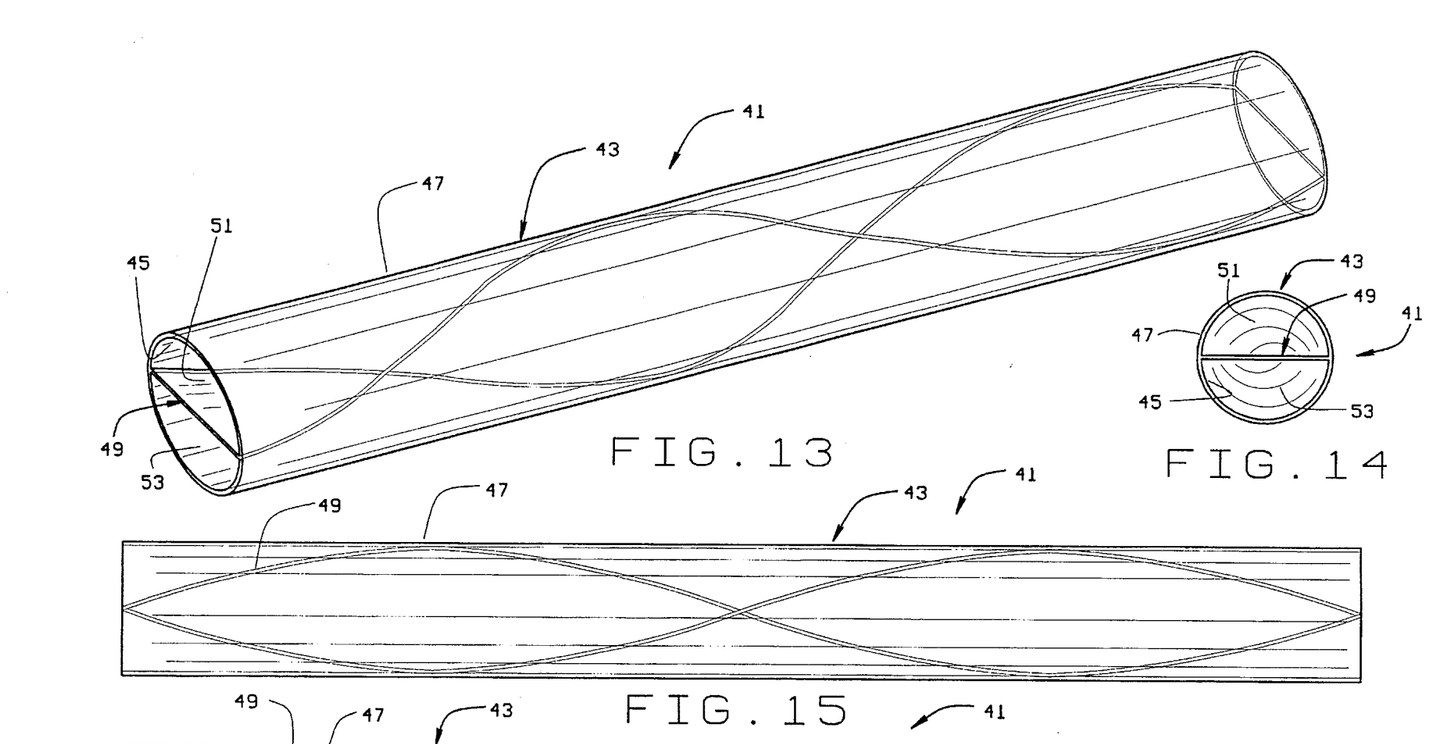
FIG. 13 is a perspective view of yet still another modified form of one-piece tube multipack of the present invention.
FIG. 14 is an end elevational view of the one-piece tube multi-pack shown in FIG. 13.
FIG. 15 is a side elevational view of the one-piece tube multi-pack shown in FIG. 13 along one predetermined position thereof.
Figure 16:
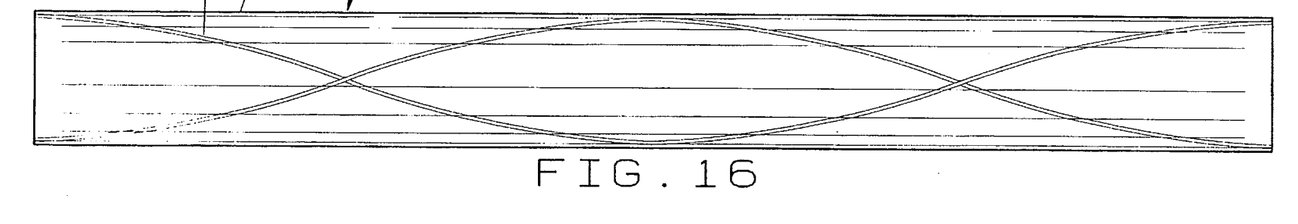
FIG. 16 is a side elevational view of the one-piece tube multi-pack shown in FIG. 13 along another predetermined position angularly offset approximately 90° from the position shown in FIG. 15.

The one-piece tube multi-pack 1 illustrated in the FIGS. 7–9 embodiment has a construction similar to that illustrated and described in connection with the FIGS. 1–3 embodiment, with the exception that a spirally extending non-transparent ribbon element 15 is attached to the outer peripherally extending wall 7 of the tubular element to enhance the attractiveness and appearance of the one-piece tube multi-pack 1. Similarly, the FIGS. 10–12 embodiment has a one-piece tube multi-pack 21 similar to the FIGS. 4–6 embodiment, with the exception of the spirally extending non-transparent ribbon element 37 attached to the outer peripherally extending wall 27 of the tubular element 23. In both instances, the spirally extending non-transparent ribbon element 15 in the case of the FIGS. 7–9 embodiment or the ribbon element 37 in the case of the FIGS. 10–12 embodiment produces an attractive and aesthetically pleasing appearance in conjunction with the transparent tubular element 3 and thin-walled web section 3, 9 in the FIGS. 7–9 embodiment and transparent tubular element 23 and thin-walled web sections 29, 29, 29 in the FIGS. 10–12 embodiment.

In the embodiment illustrated in FIGS. 13–16 of the drawings, the one-piece tube multi-pack 41 has an integral thin-walled web section 49 which is connected to the inner peripherally extending wall 45 of the tubular element 43 at different relative locations throughout the tubular element 43. In the embodiment illustrated, the integral thin-walled web section 49 is shown as extending spirally throughout the tubular element 43. It will be appreciated that other curvilinear and other modified shapes of the integral thin-walled web section 49 may be provided throughout the tubular element 43, depending upon the shape and configuration that is desired.

Like the FIGS. 4–6 and 10–12 embodiments, the spirally extending integral thin-walled web section has greater flexibility than the tubular element 43; however, the spiral construction also affords lateral rigidity to the tubular element 43, particularly in those areas where the integral thin-walled web section 49 is interconnected to the tubular element 43.

The transparent nature of the tubular element 43 and the integral thin-walled web section 49, together with the spiral shape of the integral thin-walled web section 49, produces an unusual and unique attractiveness and appearance for the one-piece tube multi-pack 41 when packaged with separate discrete products, such as multi-colored candy coated chocolates, that may be deposited in each of the compartments 51, 53.

Figures 17, 18:
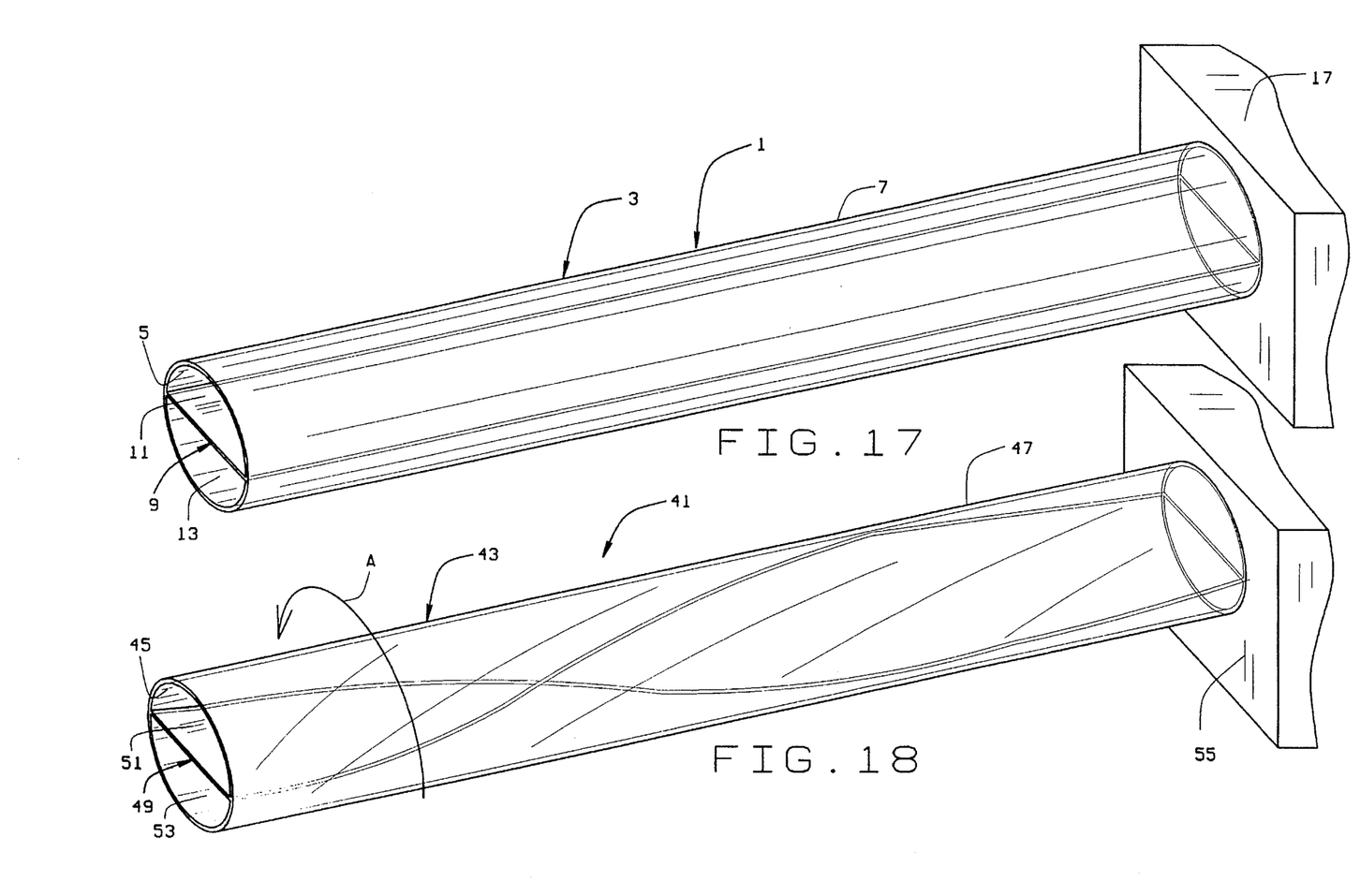
FIG. 17 is a perspective view, partially in semi-diagramatic format, illustrating the manner in which a one-piece tube multi-pack of the type illustrated in FIGS. 1–3 is extruded.
FIG. 18 is a perspective view, partially in semi-diagrammatic format, illustrating the manner in which the tubular element is twisted while in a heated state in order to form a spirally extending web section, for example, within the tubular element of the one-piece tube multi-pack.

The method of forming the one-piece tube multi-packs illustrated in FIGS. 1–16 of the drawings may be best understood by reference to FIGS. 17–18 of the drawings. FIG. 17 illustrates the manufacture of the one-piece tube multi-pack 1 shown in FIG. 1–3 of the drawings while FIG. 18 illustrates the one-piece tube multi-pack 41 illustrated in FIGS. 13–16 of the drawings.

The one-piece tube multi-pack 41 illustrated in FIG. 17 of the drawings is shown as being extruded from a profile extrusion die 17 into the shape illustrated with the elongated thin-walled tubular element 3 being simultaneously extruded along with the integral thin-walled web section 9, in a manner well-known in the art. In lieu of the single thin-walled web section 9 illustrated in the FIGS. 1–3 and 7–9 embodiments, a plurality of thin-walled web sections such as illustrated in FIGS. 4–6 and 10–12 may be simultaneously extruded in a similar manner. Shortly after the formation of the one-piece tube multi-pack 1, a spiral ribbon 15 such as illustrated in FIGS. 7–9 may be applied to the outer peripherally extending wall 7 in any well-known manner, either shortly after the extruding takes place or at a later downstream station.

FIG. 18 of the drawings illustrates the manner in which the one-piece tube multi-pack 41 of FIG. 13–16 is manufactured. Initially, the one-piece tube multi-pack 41 is formed in the same manner as the one-piece tube multi-pack 41 illustrated in FIG. 17 by extrusion from the profile extrusion die. However, shortly after the extrusion process, the tubular element 43 is twisted, as illustrated by the arrow A, while the tubular element 43 and integral thin-walled web section 49 are still in a heated state, in order to form the integral thin-walled web section 49 into the spiral configuration illustrated. As will be appreciated, only one end of the tubular element need be twisted in order to produce this desired construction. As a result, opposite rotational forces generally transverse to the longitudinal extent of the tubular element 43 will be applied at spaced distances along the length of the tubular element 43 in order to produce the spiral or curvilinear or other modified shape of the thin-walled web section 49, as may be desired.

From the foregoing, it will now be appreciated that the present invention discloses a novel one-piece tube multi-pack with an elongated thin-walled tubular element and at least one thin-walled web section integrally connected to an inner wall area of the tubular element. The integral thin-walled web section may be formed in a single or multiple form to produce two or more separate compartments for containing the plurality of discrete products or components. The shape of the at least one integral thin-walled web section may be formed as a spiral, curvilinear or other shape, depending on the design that is desired. The method of manufacturing the one-piece tube multi-pack in all of the above described formats is also illustrated and disclosed.

In view of the above, it will be seen that the several objects and advantages of the present invention have been achieved and other advantageous results have been obtained. As various changes could be made in the above construction and method without department from the scope of the invention, it is intended that all matter contained in the above description or shown in the accompanying drawings shall be interpreted as illustrative and not in a limiting sense.

We claim:

1. The method of forming a one-piece tube multi-pack from flexible plastic material, comprising the steps of:

extruding an elongated thin-walled tubular element having inner and outer peripherally extending tubular walls; and simultaneously extruding at least one integral thin-walled web section with opposite ends interconnected to the inner peripherally extending wall of said tubular element; said at least one integral thin-walled web section being formed as a flexible web section having a greater degree of flexibility than said tubular element.

2. The method of forming a one-piece tube multi-pack as defined in claim 1 including the step of simultaneously extruding a plurality of thin-walled web sections interconnected to one another at one end and interconnected to the inner peripherally extending wall of said tubular element at one opposite end, each of said thin-walled web sections being formed as a flexible web section with a greater degree of flexibility than said tubular element.

3. The method of forming a one-piece tube multi-pack as defined in claim 1 wherein the at least one integral thin-walled web section is formed to extend at different relative locations throughout the tubular element.

4. The method of forming a one-piece tube multi-pack as defined in claim 3 wherein the at least one integral thin-walled web section is formed to extend spirally throughout the tubular element, said spirally extending thin-walled web section providing laterally rigidity to the tubular element in areas where the spirally extending thin-walled element is interconnected to the tubular element.

5. The method of forming a one-piece tube multi-pack as defined in claim 4 wherein the spirally extending at least one integral thin-walled web section is formed by twisting the tubular element in opposite directions while in a heated condition.

6. The method of forming a one-piece tube multi-pack from flexible plastic material, comprising the steps of:

extruding an elongated thin-walled tubular element having inner and outer peripherally extending tubular walls;

simultaneously extruding at least one integral thin-walled web section with opposite ends interconnected to the inner peripherally extending wall of said tubular element; and twisting the tubular element while in a heated state to form the at least one integral thin-walled web section in a spiral shape throughout the tubular element, the tubular element being twisted in opposite directions for spirally twisting opposite ends of the at least one integral thin-walled web sections in opposite directions so as to increase the lateral rigidity of the tubular element in areas where the at least one integral spirally extending thin-walled web section is interconnected at opposite ends to the tubular element.

7. The method of forming a one-piece tube multi-pack as defined in claim 6 wherein the tubular element is twisted by applying opposite rotational forces generally transverse to the longitudinal extent of the tubular element at spaced distances along the length of the tubular element.

8. The method as defined in claim 6 wherein the twisting occurs shortly after extruding the tubular element.

* * * * *